US010208209B2

(12) United States Patent
Sondermann et al.

(10) Patent No.: US 10,208,209 B2
(45) Date of Patent: Feb. 19, 2019

(54) AQUEOUS AGENT AND COATING METHOD FOR THE ANTICORROSIVE TREATMENT OF METALLIC SUBSTRATES

(71) Applicants: ALUFINISH GESELLSCHAFT FÜR VERFAHRENSTECHNIK UND SPEZIALFABRIKATION VON PRODUKTEN ZUR METALLOBERFLÄCHEN- BEHANDLUNG MBH & CO. KG, Andernach (DE); THYSSENKRUPP STEEL EUROPE AG, Duisburg (DE)

(72) Inventors: Thomas Sondermann, Andernach (DE); Christoph Strahl, Andernach (DE); Matthias Kimpel, Schwelm (DE); Thomas Lostak, Oberhausen (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 533 days.

(21) Appl. No.: 14/650,189

(22) PCT Filed: Dec. 9, 2013

(86) PCT No.: PCT/EP2013/075967
§ 371 (c)(1),
(2) Date: Jun. 5, 2015

(87) PCT Pub. No.: WO2014/090752
PCT Pub. Date: Jun. 19, 2014

(65) Prior Publication Data
US 2016/0024309 A1 Jan. 28, 2016

(30) Foreign Application Priority Data
Dec. 11, 2012 (EP) .................................. 12196521

(51) Int. Cl.
C23C 22/34 (2006.01)
C23C 22/06 (2006.01)
C09D 5/08 (2006.01)
C23C 22/74 (2006.01)
C23C 22/83 (2006.01)
C23C 22/00 (2006.01)
C25D 13/20 (2006.01)

(52) U.S. Cl.
CPC ................ *C09D 5/08* (2013.01); *C23C 22/34* (2013.01); *C23C 22/74* (2013.01); *C23C 22/83* (2013.01); *C23C 2222/20* (2013.01); *C25D 13/20* (2013.01)

(58) Field of Classification Search
CPC ............................ C23C 22/34; C23C 2222/20
USPC ........................................................ 148/247
See application file for complete search history.

(56) References Cited

U.S. PATENT DOCUMENTS

2008/0081212 A1* 4/2008 Inbe .................... C09D 183/08
428/651
2009/0218228 A1* 9/2009 Inbe ....................... C08G 59/50
205/80

FOREIGN PATENT DOCUMENTS

| DE | 10 2005 015575 A1 | 10/2006 |
| DE | 10 2008 000 600 A1 | 9/2009 |
| DE | 10 2008 014 465 A1 | 9/2009 |
| EP | 0 949 353 A1 | 10/1999 |
| EP | 1 900 846 A1 | 3/2008 |
| JP | 2006 213958 A | 8/2006 |
| JP | 2007 177314 A | 7/2007 |
| JP | 2007262577 | 10/2007 |
| JP | 2009 161830 A | 7/2009 |
| JP | 2010013677 | 1/2010 |
| JP | 2012233243 | 11/2012 |

OTHER PUBLICATIONS

Japanese Office Action for Japanese Patent Application No. 2015-546965, dated Sep. 27, 2017, (7 pages).

* cited by examiner

*Primary Examiner* — Lois L Zheng
(74) *Attorney, Agent, or Firm* — Pauley Erickson & Kottis

(57) ABSTRACT

An aqueous agent for the anticorrosive treatment of metallic substrates and to a method for coating such substrates. The aqueous agent according to this invention includes at least one compound that dissociates into zirconium- or titanium-fluorine complexes in aqueous solution, at least one water-soluble compound that releases metal cations, the metal cations being selected from the group composed of: iron-, copper-, or silver ions, and a water-soluble alkoxysilane that has at least one epoxy group.

23 Claims, 1 Drawing Sheet

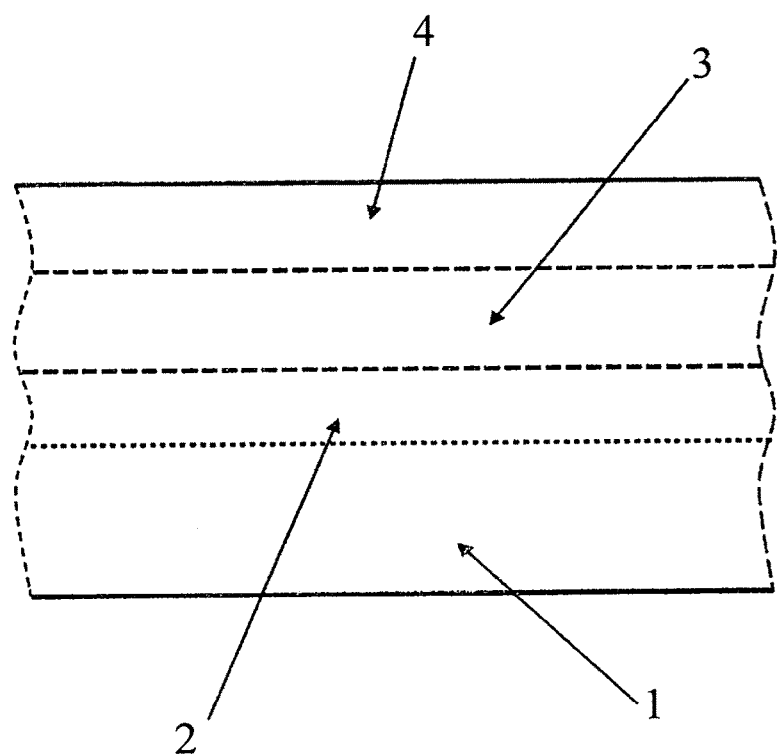

AQUEOUS AGENT AND COATING METHOD FOR THE ANTICORROSIVE TREATMENT OF METALLIC SUBSTRATES

BACKGROUND OF THE INVENTION

Field of the Invention

This invention relates to an aqueous agent for the anticorrosive treatment of metallic substrates and to a method for coating such substrates.

Discussion of Related Art

Generally, metallic substrates such as sheet steels for the automotive industry are disadvantageously subject to corrosion on their surfaces.

The corrosion can, however, be counteracted by applying a coating and/or by producing a conversion layer by a conversion treatment of the relevant substrate. In the following, the conversion layer is understood to be a layer that is produced through chemical transformation (conversion) of the substrate on its surface and of various components of an aqueous passivation agent.

A conversion treatment is often used as a pretreatment. In such cases, the pretreatment is used on the metal surface in order to improve its corrosion resistance and also the adhesion properties. In this way, the surface is prepared to be provided with another organic coating.

German Patent Reference DE 10 2006 000 600 B4 discloses a method for coating metallic surfaces. The aqueous composition used for the coating includes at least one phosphate, at least one zirconium compound, a complexing agent, and cations of aluminum and/or zinc.

Due to negative environmental influences, however, methods that use phosphate compounds and chromium compounds are increasingly being replaced with alternative methods.

One possible alternative is the use of acidic aqueous solutions of fluoro complexes which have known anticorrosive properties.

German Patent Reference DE 10 2008 014 465 A1, for example, discloses an aqueous, chromium-free agent for anticorrosive conversion treatment of metallic surfaces. The agent contains zirconium- and fluorine compounds as well as water-soluble compounds that release iron- and copper ions. After the conversion treatment, the metallic surface undergoes a subsequent dip painting.

If the conversion treatment is to serve as a pretreatment for an additional coating, then stricter requirements are placed on the adhesion properties of the conversion layer. Both the adhesion between the substrate and the conversion layer and the adhesion between the conversion layer and the additional layer must be improved in order to avoid negative effects such as the infiltration of rust underneath the anticorrosive layers as much as possible.

EPO Patent Reference EP 1 900 846 A1 describes a method for the chemical conversion treatment of metallic substrates. According to the method in EPO Patent Reference EP 1 900 846 A1, zirconium and fluorine serve as components for producing the conversion layer and as agents for etching the metal surface so that it is possible to increase the corrosion resistance. In addition, an alkoxysilane, which has one amino group, is used as another component for improving the adhesion of the conversion layer both to the substrate and to a coating that is to be applied subsequently.

When using silanes that have functional groups in the form of amino groups, however, it is important to note that the adhesion of the conversion layer to a paint layer that is applied over it does not always meet the imposed requirements.

There remains a need for agents and methods for anticorrosive treatment of metallic substrates, which in addition to anticorrosive properties, also have optimal adhesion properties, thus making it possible to largely avoid the danger of infiltration under the paint.

SUMMARY OF THE INVENTION

One object of this invention is to provide an aqueous agent for the anticorrosive treatment of metallic substrates, which has the best possible properties with regard to corrosion protection and involves the least possible negative environmental influences.

This object is attained by the agent proposed according to this specification and in the claims, and as disclosed by preferred embodiments of the agent according to this invention.

According to this invention, the aqueous agent according to this invention for the anticorrosive treatment of metallic substrates includes:
  at least one compound that dissociates into zirconium-fluoride complexes or titanium-fluoride complexes in aqueous solution;
  at least one water-soluble compound that releases metal cations; and
  a water-soluble alkoxysilane that has at least one epoxy group.

In this case, the released metal cations are ions that are selected from the group composed of: iron-, copper-, and silver-ions.

The use of alkoxysilanes with functional epoxy groups makes it possible to preferably eliminate the use of silanes that have amino groups. In this case, the adhesive effect can be provided by the epoxy group, which can react with amino groups of an additionally applied coating.

Preferably, the agent according to this invention is essentially phosphate-free so that the percentage of oxygen-containing anions of phosphorus contained therein preferably does not exceed 10 ppmw (parts per million by weight) and particularly preferably, does not exceed 1 ppmw.

The use of the phosphate-free agent makes it possible to avoid the disadvantage of sludge buildup due to local precipitation of low-solubility phosphates.

Preferably, the agent is essentially chromium-free so that the percentage of chromium ions contained therein preferably does not exceed 10 ppmw (parts per million by weight) and particularly preferably, does not exceed 1 ppmw.

With the chromium-free and/or phosphate-free composition, it is possible to largely minimize possible environmental damage due to the use of the agent.

Preferably, the agent is essentially nickel-free so that the percentage of nickel ions contained therein does not exceed 10 ppmw (parts per million by weight) and particularly preferably, does not exceed 1 ppmw.

With the nickel-free composition, it is possible to largely minimize possible environmental damage due to the use of the agent.

According to one preferred embodiment of this invention, the agent is essentially chromium-free, phosphate-free, and nickel-free. It is thus possible to significantly minimize environmental damage.

According to this invention, the zirconium component contributes to the anticorrosive action of the agent, particularly by forming a passivizing oxide layer on the substrate surface.

According to one preferred embodiment of this invention, the compound that dissociates into zirconium-fluorine complexes or titanium-fluorine complexes in aqueous solution is selected from the group composed of: hexafluorozirconic acid, dipotassium hexafluorozirconate, disodium hexafluorozirconate, ammonium hexafluorozirconate, magnesium hexafluorozirconate, dilithium hexafluorozirconate, and the analogous titanium compounds and combinations thereof.

The concentration of zirconium preferably lies in the range from $10^{-5}$ mol/l to $10^{-1}$ mol/l, more preferably in the range from $2*10^{-5}$ mol/l to $10^{-2}$ mol/l, and particularly preferably in the range from $10^{-4}$ mol/l to $2*10^{-3}$ mol/l relative to the aqueous agent.

With the released metal ions, the compound that releases metal ions advantageously influences the thermodynamics and the kinetics of the conversion process on the metallic substrate to be coated.

The compound used for the agent according to this invention, which releases metal cations in aqueous solution, can for example be iron chloride, iron citrate, iron sulfate, iron nitrate, iron acetate, iron tartrate, an iron-carboxylic acid compound, copper acetate, copper chloride, copper nitrate, copper sulfate, a copper-carboxylic acid compound, silver chlorides, silver acetate, silver sulfate, silver nitrate, or combinations thereof; other compounds that release metal cations in aqueous solution are also conceivable.

The preferred concentration of metal cations relative to the aqueous agent lies in the range from $10^{-6}$ mol/l to $10^{-1}$ mol/l, more preferably in the range from $10^{-5}$ mol/l to $10^{-2}$ mol/l, and particularly preferably in the range from $2*10^{-5}$ mol/l to $10^{-3}$ mol/l.

The alkoxysilane of the agent according to this invention is particularly used as an adhesion promoter. In this function, the alkoxysilane produces an adhesive promoting phase between each pair of boundary surfaces. In this case, the alkoxysilane can be used as a coupling molecule between metal oxides, for example on the surface of a galvanized strip steel, and an upper coating layer such as a polymer layer, for example a layer of paint. Starting from molecular precursors, a sol-gel coating develops here, which bonds with the coating layer (in a partially covalent fashion) via an interpenetrating network.

An appropriate molecular functionality of the alkoxysilane is particularly advantageous for successfully promoting adhesion. The adhesive promoting action of the alkoxysilane of the agent according to this invention is particularly provided on the one hand through a reaction of the epoxy group with an amino group of the upper coating layer and on the other hand through a covalent bonding to a metal oxide of the metallic substrate by a hydroxy group produced by the hydrolysis of the alkoxysilane.

The alkoxysilane of the agent according to this invention can preferably be selected to be one of the following compounds: [3-2(2,3-epoxypropoxy)-propyl]-trimethoxysilane, [3-2(2,3 -epoxypropoxy)-propyl]-triethoxysilane, [3-2(2,3 -epoxypropoxy)-propyl]-methyldiethoxysilane, [3-2(2, 3-epoxypropoxy)-propyl]-methyldimethoxysilane, [3-2(2,3-epoxypropoxy)-propyl]-dimethylethoxysilane.

According to one embodiment of this invention, the proportion by weight of the alkoxysilane is between 0.45 wt. % and 5 wt. %, preferably, the proportion by weight is between 0.6 wt. % and 3 wt.% , and particularly preferably, is between 0.8 wt. % and 1.5 wt. % of the conversion solution.

For the function of the aqueous agent according to this invention, it is advantageous if it has a pH value in the acid range. This can be achieved, for example, if the compound that dissociates into zirconium- or titanium-fluorine complexes is used in the form of an acid. Preferably, the pH value of the agent lies in the range between 2.5 and 5, particularly preferably in the range between 3.5 and 4. The desired degree of acidity can be adjusted through the use of additional acids such as nitric acid or sulfuric acid. In addition, the agent according to this invention can contain a buffer system, which can be used for adjusting the pH value of the agent. The buffer system can include buffer substances such as ammonium hydroxide, ammonium carbonate, ammonium bicarbonate, organic amines, alkali metal hydroxides, alkali carbonates, or alkali bicarbonates.

Three sample recipes for the aqueous agent are given below:

EXAMPLE 1

0.5 g/liter hexafluorotitanic acid
0.005 g/liter copper(II) acetate
7.5 g/liter [3-2(2,3-epoxypropoxy)-propyl]-methyldiethoxysilane pH value 3.5

EXAMPLE 2

1 g/liter hexafluorotitanic acid
0.01 g/liter silver nitrate
13 g/liter [3-2(2,3-epoxypropoxy)-propyl]dimethylethoxysilane pH value 4.0

EXAMPLE 3

1 g/liter hexafluorozirconic acid
0.01 g/liter silver nitrate
11 g/liter [3-2(2,3-epoxypropoxy)-propyl]-dimethylethoxysilane pH value 4.5

Another object of this invention is to provide a method for coating metallic substrates that offers the best possible corrosion protection for the coated surfaces.

This object is attained by one method for coating metallic substrates according to different preferred embodiments of the method, as discussed in this specification and in the claims.

Consequently, the method according to this invention includes the following method steps.

First, a conversion solution is produced. To this end, an aqueous solution is prepared, which contains dissociated zirconium- or titanium-fluorine complexes. Then a water-soluble compound that can release metal cations is added to this solution, the metal cations being iron-, copper-, and/or silver ions. The pH value of the solution is set to a value between 2.5 and 5. The pH value can be adjusted through the addition of buffer substances. Typical buffer substances that can be used in this context include ammonium hydroxide, ammonium carbonate, ammonium bicarbonate, organic amines, alkali metal hydroxides, alkali carbonates (K, Na, Li), or alkali bicarbonates (K, Na, Li). In addition, an alkoxysilane is added to the solution; the alkoxysilane has at least one epoxy group.

The previously produced conversion solution is applied to a metallic substrate. The application of the solution to the substrate here can be carried out by immersing the substrate or at least a part of the substrate, for example a substrate surface, in the conversion solution. The application can, however, also be carried out by spraying the solution onto at least parts of the substrate, by coating, or by a comparable method. The application takes place at room temperature, such as at a temperature between 15° C. and 30° C., preferably approximately 20° C. The conversion solution is applied to the substrate for an application duration of between 0.5 seconds and 500 seconds, preferably between 3 s and 300 s.

The substrate that is treated by the conversion solution is then dried. An additional rinsing with deionized water or tap water is possible here, but not necessary. Preferably, the drying takes place in a flow of nitrogen or air. In some embodiments of the method, the drying takes place in the pre-dried gas flow. The gas in this case can be advantageously heated. A pressure reduction and/or a direct energy input through the use of infrared radiation (IR) and/or near-infrared radiation (NIR) as well as possibly UV radiation can be used to assist the drying. Another possibility for the drying is sublimation drying ("freeze drying").

According to one preferred embodiment of the method of this invention, the conversion solution is produced by the above-described agent for anticorrosive treatment of metallic substrates and in particular, has one or more properties of the agent.

According to another embodiment of this invention, the method includes the method step of force drying at 40° C. to 120° C., preferably at 80° C. to 100° C. The force drying can be carried out after the drying of the treated substrate. For example, it can be performed by a correspondingly suitable oven- or drying chamber system. The force drying advantageously makes it possible to achieve a particularly effective covalent bonding of the employed silanes to the substrate surface.

Preferably, the substrate is cleaned before the conversion solution is applied. For example, the cleaning can include the use of one or more alkaline or mild alkaline immersion cleaners. It can also include a rinsing of the substrate with deionized water or comparable substances as well as a drying of the substrate in a flow of warm air. Such a cleaning treatment can increase the effectiveness of the subsequent conversion treatment.

According to one embodiment of the method of this invention, the treated substrate can be provided with an additional coating. After the treatment with the conversion solution and after the drying, the substrate is preferably coated with a suitable paint system. The particularly suitable paint systems include powder coatings, cathodic electrodeposition paints, coil coating paints, highly weather-resistant paint systems, and UV paint systems. Preferably, the paints include compounds that permit bonding to the alkoxysilanes. The additional paint coating increases the corrosion resistance of the substrate and as a result, can also advantageously influence other, for example visual, properties of the treated surfaces.

This invention also includes the metallic substrate that has been treated or coated by the method described above. The suitable substrates particularly include Zn—Al alloys (Galfan®, Galvalume®), electrolytically galvanized strip steels, Zn—Al—Mg alloys, aluminum and its alloys (including cast alloys), iron- and steel surfaces, and magnesium alloys.

BRIEF DESCRIPTION OF THE DRAWING

This invention is explained below in view of a schematic view of a treated substrate.

FIG. 1 shows an exemplary embodiment of a schematic layer structure of a treated substrate according to this invention.

DETAILED DESCRIPTION OF THE INVENTION

In detail, FIG. 1 shows a cross-section through a part of a treated substrate. The illustration is only intended to clarify the basic layer structure of the treated substrate. It is not suitable for providing any information regarding layer thickness or layer transitions.

The boundaries between the individual layers 1, 2, 3, 4 are shown as broken lines in order to clarify that there is generally not an abrupt transition between the layers 1, 2, 3, 4, but rather a smooth transition within a particular region.

In the example shown in FIG. 1, the metallic substrate to be treated is represented in the form of a hot-dip galvanized sheet steel. The galvanized steel plate therefore includes a bottom layer 1, which is essentially composed of steel, and a zinc coating 2. The zinc coating 2 primarily contains zinc and zinc oxide. Instead of the layers 1 and 2, it is also possible to use other treated or untreated substrates such as aluminum alloys, Zn—Al—Mg alloys, magnesium alloys, or the like.

An overlying conversion layer 3 is produced through a conversion treatment of the substrate. To that end, the substrate is brought into contact with the conversion solution after being cleaned for several seconds in a bath system. By subsequent drying at 80° C. to 100° C., it is possible to achieve a good adhesion of the layers 2 and 3 through covalent bonding of silanes to the substrate surface 2. The alkoxysilanes contained in the conversion layer 3 provide a good adhesion of the corrosion protection coating 3 both to the zinc coating 2 and to the paint layer 4 that is applied as the top layer. Organic compounds contained in the paint layer 4 have amino groups so that a reaction of these amino groups with the epoxy groups of the silane can take place, which yields an improved bonding of the conversion layer 3 to the paint layer 4.

The invention claimed is:

1. An aqueous conversion solution for an anticorrosive treatment of metallic substrates as a pre-treatment for a further lacquer coating, including:
    at least one compound that dissociates into zirconium- or titanium-flourine complexes in aqueous solution,
    at least one water-soluble compound that releases metal cations, selected from the group composed of: iron-, copper-, or silver ions, and
    a water-soluble alkoxysilane that has at least one epoxy group as an adhesion-promoting phase, the alkoxysilane comprising a [3-2(2,3-epoxypropoxy)-propyl]-trimethoxysilane, a [3-2(2,3-epoxypropoxy)-propyl]-triethoxysilane, a [3-2(2, 3 -epoxypropoxy)-propyl]-methyldiethoxysilane, a [3-2(2,3 -epoxypropoxy)-propyl]-methyldimethoxysilane, a [3-2(2,3-epoxypropoxy)-propyl]-dimethylethoxysilane, or combinations thereof.
    wherein the conversion solution is essentially free of phosphate, chromium, and silanes having amino groups, and the epoxy group of the adhesion-promoting phase reacts with an amino group of the further lacquer coating.

2. The aqueous conversion solution according to claim 1, wherein the compound that dissociates into zirconium- or titanium-fluorine complexes in aqueous solution is selected from the group composed of: dipotassium hexafluorozirconate, disodium hexafluorozirconate, ammonium hexafluorozirconate, magnesium hexafluorozirconate, dilithium hexafluorozirconate and combinations thereof, as well as the analogous titanium-fluorine compounds and combinations thereof.

3. The aqueous conversion solution according to claim 2, wherein the concentration of zirconium lies in a range from $10^{-5}$ mol/l to $10^{-1}$ mol/l.

4. The aqueous conversion solution according to claim 3, wherein the compound that releases metal cations is selected from the group composed of: iron chlorides, iron citrates, iron sulfates, iron nitrates, iron acetates, iron tartrates, iron-carboxylic acid compounds, copper acetates, copper chlorides, copper nitrates, copper sulfates, copper-carboxylic acid compounds, silver chlorides, silver acetates, silver sulfates, silver nitrates, and combinations thereof.

5. The aqueous conversion solution according to claim 4, wherein the concentration of the metal cations lies in a range from $10^{-6}$ mol/l to $10^{-1}$ mol/l.

6. The aqueous conversion solution according to claim 5, wherein a proportion by weight of the alkoxysilane is between 0.45 wt. % and 5 wt.

7. The aqueous conversion solution according to claim 6, wherein a pH-Wert of the conversion solution lies in a range between 2.5 and 5.

8. The aqueous conversion solution according to claim 1, wherein the concentration of zirconium lies in a range $2*10^{-5}$ mol/l to $10^{-2}$ mol/l.

9. The aqueous conversion solution according to claim 1, wherein the compound that releases metal cations is selected from the group composed of: iron chlorides, iron citrates, iron sulfates, iron nitrates, iron acetates, iron tartrates, iron-carboxylic acid compounds, copper acetates, copper chlorides, copper nitrates, copper sulfates, copper-carboxylic acid compounds, silver chlorides, silver acetates, silver sulfates, silver nitrates, and combinations thereof.

10. A coating method, for an anticorrosive treatment, for metallic substrates, including the following method steps:
producing the conversion solution of claim 1 by adding a water soluble compound that releases the metal cations, selected from the group composed of: iron-, copper-, or silver ions, in an aqueous solution that contains dissociated zirconium- or titanium-fluorine complexes, adjusting a pH value of the solution, through adding a buffer substance, to a pH value between 2.5 and 5, and adding the alkoxysilane to the solution, where the alkoxysilane has the at least one epoxy group;
applying the conversion solution onto the substrate through immersion, spraying, or coating at room temperature and for a duration between 0.5 s and 500 s; and
drying the treated substrate.

11. The method according to claim 10, wherein the drying is carried out in a flow of nitrogen or air, by sublimation drying, and/or through the use of IR-, NIR- or UV radiation.

12. The method according to claim 11, wherein the conversion solution is the aqueous agent according to claim 9.

13. The method according to claim 12, wherein after a method step of the drying, a forced drying takes place at 40° C. to 120° C.

14. The method according to claim 13, wherein before the method step of the application of the conversion solution, a cleaning of the substrate takes place.

15. The method according to claim 14, wherein the method also includes a coating of the treated substrate with a paint system.

16. The aqueous conversion solution according to claim 1, wherein the concentration of the metal cations lies in a range from $10^{-6}$ mol/l to $10^{-1}$ mol/l.

17. The aqueous conversion solution according to claim 1, wherein a proportion by weight of the alkoxysilane is between 0.45 wt. % and 5 wt. %.

18. The aqueous conversion solution according to claim 1, wherein a pH-Wert of the conversion solution lies in a range between 2.5 and 5.

19. The method according to claim 10, wherein the conversion solution is the aqueous agent according to claim 1.

20. The method according to claim 10, wherein after a method step of the drying, a forced drying takes place at 40° C. to 120° C.

21. The method according to claim 10, wherein before the method step of the application of the conversion solution, a cleaning of the substrate takes place.

22. The method according to claim 10, wherein the method also includes a coating of the treated substrate with a paint system.

23. The aqueous conversion solution according to claim 1, further comprising a buffer system for adjustment of a pH value.

* * * * *